United States Patent [19]

Fisher et al.

[11] Patent Number: 4,527,600
[45] Date of Patent: Jul. 9, 1985

[54] COMPRESSED NATURAL GAS DISPENSING SYSTEM

[75] Inventors: Harry W. Fisher, Pittsburgh; Emil E. Hrivnak, Monroeville, both of Pa.

[73] Assignee: Rockwell International Corporation, Pittsburgh, Pa.

[21] Appl. No.: 476,900

[22] Filed: Mar. 18, 1983

Related U.S. Application Data

[63] Continuation-in-part of Ser. No. 375,065, May 5, 1982, abandoned.

[51] Int. Cl.$^3$ .............................................. B65B 3/04
[52] U.S. Cl. .................................. 141/4; 141/94;
73/861.02; 222/52; 222/54; 364/479; 364/509; 364/510; 377/21

[58] Field of Search .......................... 141/1–12,
141/37–66, 98, 94, 95, 96; 222/52, 54; 364/364, 509, 510, 479; 377/21; 73/861.02, 861.03

[56] References Cited

U.S. PATENT DOCUMENTS 4,419,898 12/1983 Zanker et al. ............... 73/861.02

Primary Examiner—Houston S. Bell, Jr.

[57] ABSTRACT

A system and method for dispensing compressed gas from a storage tank is disclosed in which the temperature and pressure in the tank is measured before and after the dispensing cycle and electric signals representative of these values are applied to a processor/computer which is programmed to compute from these signals the volume of gas dispensed.

28 Claims, 3 Drawing Figures

COMPRESSED NATURAL GAS DISPENSING SYSTEM

This application is a continuation-in-part of Ser. No. 06/375,065, filed May 5, 1982 and now abandoned.

BACKGROUND OF THE INVENTION

1. Field of the Invention

This invention relates to apparatus and methods for determining the amount of compressed natural gas dispensed from a storage tank under pressure to a receptacle, for example a tank, carried by a vehicle under a pressure lower than the pressure of the storage tank.

2. Description of the Prior Art

It has long been known that gasoline engines of the type used in automotive vehicles can, with relatively minor modifications, be made to run efficiently on compressed natural gas (CNG). It is fairly common practice for fleet owners, such as utilities and, particularly, gas utilities, to convert their vehicle fleet to operate on GNG. However, the systems and methods of measuring the amount of CNG dispensed to the individual vehicles has, in the past, produced relatively imprecise results. This is particularly true of gas utilities, since the utility is using its own product and only imprecise accounting methods are employed, if any at all.

Because of the escalating cost of conventional fuels, such as gasoline and diesel fuel, in recent years and the fact that the products of combustion of CNG do not have as great a polluting effect on the atmosphere as do such conventional fuels, interest in converting vehicles used by the general public to operate on CNG has intensified. However, before such interest can be economically developed, methods and systems for dispensing CNG to the general public which are much more precise and accurate than those employed to data would have to be developed. One obvious approach to measuring the amount of gas dispensed to the consumer would be to meter the product in a manner somewhat similar to that which is used in connection with conventional gasoline. Because the pressures in the storage tank would be high (e.g. 3600 p.s.i.) and the pressures in the vehicles which could be anything from atmospheric pressure to a relatively high pressure (e.g. 2400 p.s.i.), the use of mass meters which directly measure the mass of the dispensed fluid may be considered as one approach. However, the use of such meters would be difficult and expensive under the conditions in which they would have to operate.

SUMMARY OF THE INVENTION

To meet problems such as outlined above, the invention herein disclosed contemplates a method and system for dispensing CNG which provides relatively precise measurements of the volume of GNG dispensed without the use of conventional metering devices. In accordance with the instant invention, a storage tank is charged with CNG to a relatively high pressure, for example 3600 p.s.i. The dispensing conduit leading from the storage tank to the vehicle tank has control elements, such as a control valve, a pressure regulator and a flow transducer as well as means to connect the conduit to the vehicle by means of a pressure-tight coupling. Temperature and pressure transducers are provided in the storage tank which produce a signal representative of the temperature and pressure within the tank. A process control computer is provided which continuously monitors the temperature and pressure within the tank. From the values of the temperature and pressure within the storage tank just prior to the beginning of the dispensing operation and the values of the temperature and pressure within the tank after the completion of the dispensing operation, the computer computes the volume of gas dispensed during the dispensing operation in accordance with well known physical laws with which it has been programmed. Suitable readouts from the computer are provided all as described hereinafter.

DESCRIPTION OF THE PREFERRED EMBODIMENT

Figure 1:
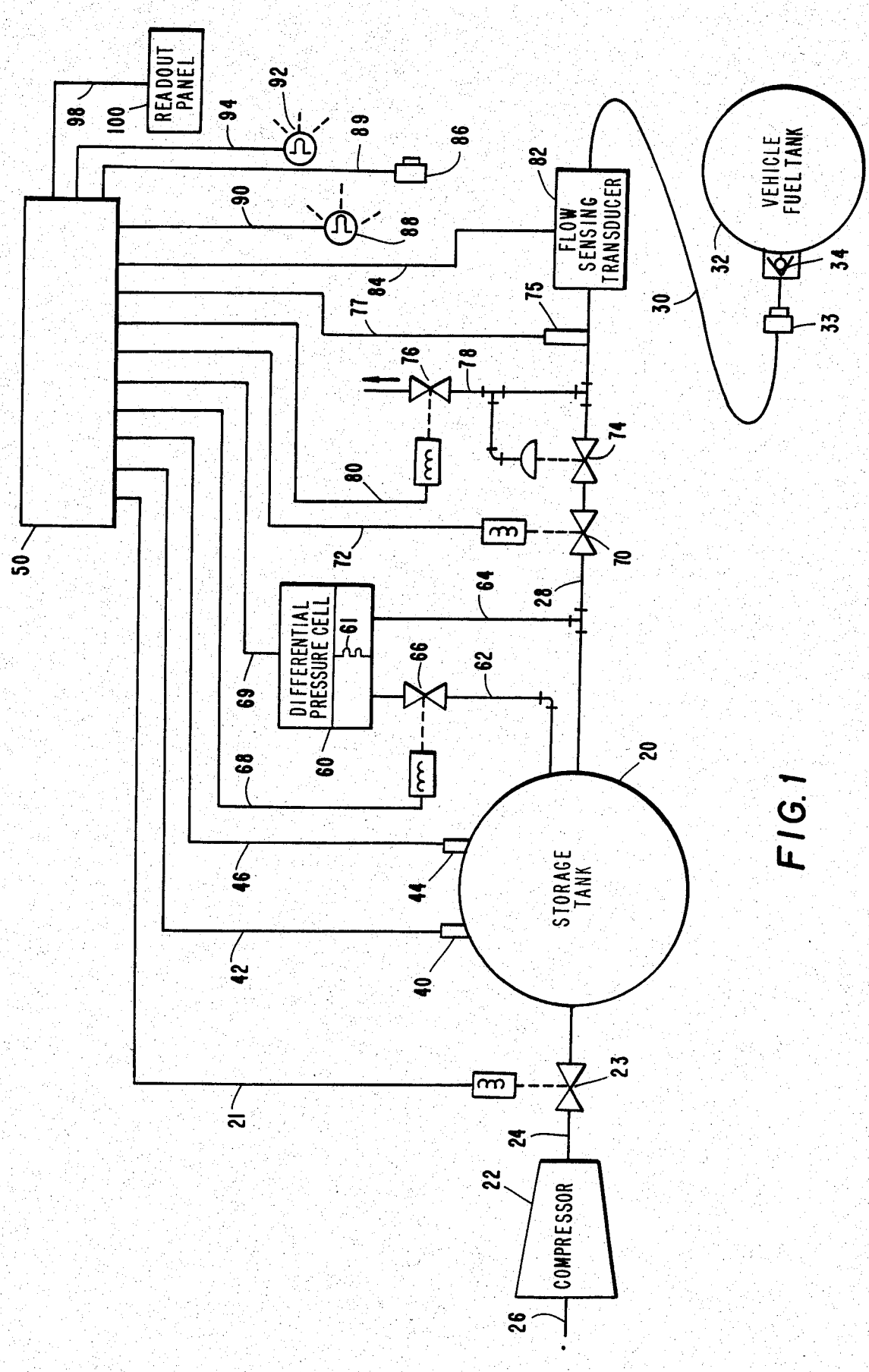
FIG. 1 shows a system embodying the instant invention for dispensing and measuring the volume of the CNG dispensed.

Referring to FIG. 1, a storage tank 20 is connected to a compressor 22 through pipeline 24, the compressor, in turn, being connected to a natural gas pipeline 26. A solenoid-controlled charging valve 23 controls the flow of CNG from the compressor to the storage tank and is itself controlled by an electric signal from a process control computer 50 (hereinafter "computer") through circuit 21. The pressure within tank 20 preferably will normally be maintained at a pressure of 3600 p.s.i., although other pressures could be selected.

Conduit 28 connects the storage tank 20 to a flexible dispensing hose 30 which is adapted to be connected to the vehicle fuel tank 32 through a conventional pressure-tight coupling 33. A one way valve 34 on tank 32 prevents the escape of gas from the tank when hose 30 is not coupled to the tank. A temperature transducer 40 senses the temperature within the storage tank 20 and produces an electric signal representative of the value of the temperature within the tank, which signal is transmitted to computer 50 by means of circuit 42. Similarly, a pressure transducer 44 senses the pressure within the storage tank 20 and produces an electric signal representative of the value of that pressure which is transmitted to the computer 50 by means of circuit 46.

A differential pressure cell 60 has one side of its diaphragm or sensing member 61 connected to tank 20 through conduit 62 and the valve 66 and the other side of the diaphragm is connected to conduit 28 through conduit 64. Solenoid-operated valve 66 in conduit 62 is controlled by signals produced by the computer 50 and transmitted to the solenoid of valve 66 through conduit 68. A solenoid-controlled feed valve 70 in conduit 28 functions as the main control valve to control the flow of GNG from the storage tank 20 to tank 32 and is controlled by a signal from the computer 50 through circuit 72.

A pressure regulator 74 in conduit 28 is set to maintain the pressure of the gas downstream of the regulator at 2400 p.s.i., although other pressures could be selected, so long as the selected pressure is less than the pressure in tank 20. The inlet of a solenoid-controlled bleed valve 76 and the diaphragm of regulator 74 are connected to conduit 28 downstream of the regulator through conduit 78, the bleed valve being controlled by an electric signal from the computer 50 through circuit 80. If desired, the outlet of valve 76 may be connected back to the supply line 26 through a suitable return system (not shown).

A pressure transducer 75 senses the presence or absence of pressure in the conduit 28 downstream of the regulator 74 and produces an electric signal in circuit 77 to computer 50 indicative of the presence or absence of pressure in conduit 28 downstream of the control valve 70.

A flow sensing transducer 82 is also located in conduit 28 downstream of the regulator 74 which senses flow and produces an electric signal indicating whether or not gas is flowing through the conduit 28, which signal is applied to the computer 50 through conduit 84. When flow through conduit 28 is stopped, the signal in circuit 84 will be changed or discontinued. A momentary contact initiate button switch 86 connected to the computer 50 through circuit 89, when depressed, will apply a signal to the computer to condition the computer to begin a dispensing cycle.

A ready light signal 88 may also be connected to and controlled by the computer through line 90 to indicate when the system is in condition to initiate a dispensing cycle. Also, an indicator light 92 is controlled by the computer through line 94 to indicate whether or not any pressure exists in conduit 28 downstream of control valve 70.

Since gas is an expansible and compressible medium, it is obvious that the amount of energy contained in gas flowing in a pipeline at a fixed rate is different for one set of values of pressure and temperature than would be contained in the gas at a different set of pressures and temperatures. Similarly, in a closed vessel of fixed volume, the energy contained in the vessel at a first set of values of temperature and pressure will be different from the energy in the tank if the pressure within the tank is relieved by exhausting gas from the tank, which would also reduce the temperature of the gas within the tank. Obviously, the volume of the tank cannot change, but the energy content within the tank has been reduced. Thus, the temperature and pressure of a gas within a closed vessel is a measurement of the energy content of the gas within the vessel. For this reason, in the volumetric measurement of gas under varying conditions of pressure and temperature, it is convenient to convert the volume of gas measured to the volume it would occupy at standard reference conditions usually taken to be 60° F. (520° Rankin) and atmospheric pressure (14.7 p.s.i.a).

The relationship between the volume, pressure and temperature of a gas in a closed vessel and the volume the gas would occupy at standard reference conditions of pressure and temperature is expressed by the equation:

$$V_T P_T S_T / T_T = V_s P_s S_s / T_s \tag{1}$$

where $V_T$, $P_T$, $T_T$, and $S_T$ are, respectively, the volume of the vessel (tank), the pressure and temperature of the gas within the tank and supercompressibly factor of the gas within the tank at a pressure and temperature, and where $V_s$, $P_s$, $T_s$, and $S_s$, are, respectively, the volume, pressure, temperature and supercompressibility factors of the gas if expanded or compressed to standard conditions of pressure and temperature.

The supercompressibility factor takes into account the fact that different gases compress or expand at a different rate. These factors may be readily calculated for any pressure and temperature. For a perfect gas, the supercompressibility factor would be 1.0.

Solving equation (1) for the volume at standard conditions ($V_s$) yields $$V_s = V_T P_T S_T T_s / T_T P_s S_s \tag{2}$$

In the system described above the difference ($V_s$) in the volume at standard conditions initially before the dispensing operations ($V_{s1}$) and the volume at standard conditions after the dispensing operation ($V_{s2}$) will give the volume at standard conditions of the gas dispensed. It is this volume difference ($V_s$) for which the customer is to be charged. This relationship may be expressed by the equation:

$$\Delta V_s = V_{s1} - V_{s2} \tag{3}$$

where $V_{s1}$ = standard volume before the dispensing operation (initial), $V_{s2}$ = standard volume after the dispensing operation (final), and $\Delta V_s$ = volume dispensed.

Substituting equation (2) in equation (3) and applying the subscripts (1) and (2) to the various factors to indicate respectively initial and final conditions of pressure, temperature and supercompressibility of the gas within the tank, produces the following equation $$\Delta V_s = V_{s1} - V_{s2} = \frac{V_T P_{T1} T_s S_{T1}}{T_{T1} P_s S_s} - \frac{V_T P_{T2} T_s S_{T2}}{T_{T2} P_s S_s} \tag{4}$$

or $$\Delta V_s = \frac{V_T T_s}{P_s S_s} \left[ \frac{T_{T2} P_{T1} S_{T1} - T_{T1} P_{T2} S_{T2}}{T_{T1} T_{T2}} \right] \tag{5}$$

The acutal physical volume of the tank $V_T$, as well as the pressure $P_s$, the temperature $T_s$, and supercompressibility factor $S_s$ at standard conditions, are constant values. The supercompressibility factor for various operating values of pressure and temperature may be calculated and the computer programmed with these values. Alternatively, the formula for computing the supercompressibility factors at various pressures and temperatures could be programmed into the computer and computed as a separate computation, or the formula could be combined with equation (5).

With the computer programmed to solve equation (5) and programmed with the supercompressibility factor at all pressures and temperatures likely to be encountered during operation, by sensing the initial tank pressure $P_{T1}$ and initial temperature $T_{T1}$ and the final pressure $P_{T2}$ and temperature $T_{T2}$ after the dispensing operation, the dispensed volume at standard conditions $\Delta V_s$ will be calculated by the computer and a signal representative thereof applied to the readout panel 100 through line 98 to provide a visible indication of the dispensed volume.

However, a higher degree of resolution and, therefore, a greater degree of accuracy in determining the final pressure value may be obtained by directly sensing the difference $\Delta P$ between the initial pressure and final pressure, instead of sensing first the initial pressure $P_{T1}$ and then the final pressure $P_{T2}$. This may be accomplished by the pressure differential cell 60. As explained above, before the dispensing cycle is begun, control valve 70 is closed and valve 66 is opened so that the pressure within the tank is applied to both sides of the diaphragm 61 of the cell 60, the pressure within tank 20, conduits 62, 64 and 28 upstream of valve 70 being equal at this point. Pressure cell 60 produces an electric signal in circuit 69 representative of the differential pressure being measured across diaphragm 61, which in this initial condition is zero. When the dispensing cycle is initiated, the valve 66 is closed, thereby trapping the initial pressure $P_{T1}$ in the cell so that initial tank pressure is maintained on one side of the diaphragm of the cell 60 throughout the dispensing cycle. However, as gas is dispensed, the pressure in conduit 28 decreases until it reaches a final stable value $P_{T2}$ at the end of the dispensing cycle. At that point, the pressure across the diaphragm of the cell will be the difference between the initial pressure $P_{T1}$ and final pressure $P_{T2}$, and the signal produced in line 69 will be representative of this difference. This pressure difference $\Delta P$ may be expressed by the equation:

$$\Delta P = P_{T1} - P_{T2} \tag{6}$$

Solving for $P_{T2}$:

$$P_{T2} = P_{T1} - \Delta P \tag{7}$$

and substituting the above expression for $P_{T2}$ in equation (5):

$$\Delta V_s = \frac{V_T T_s}{P_s S_s} \left[ \frac{T_{T2} P_{T1} S_{T1} - T_{T1}(P_{T1} - \Delta P) S_{T2}}{T_{T2} T_{T1}} \right] \tag{8}$$

It will be noted that equation (8) does not contain a factor for the final pressure $P_{T2}$ but rather this factor is expressed in terms of the initial pressure $P_{T1}$, the signal for which is produced by transducer 44, and the difference between the initial and final pressures $\Delta P$, the signal for which is produced in line 69 by differential cell 60. In such a case the computer will be programmed to solve equation (8) instead of (5).

Since the magnitude of $\Delta P$ will always be much smaller than the value for $P_{T2}$, a greater degree of resolution and therefore accuracy is obtained by programming the computer to solve equation (8) and utilizing the differential pressure cell 60 which is more sensitive to the smaller variations in $\Delta P$.

At the beginning of the dispensing cycle, valve 23 and control valve 70 are closed and there is no pressure in conduit 28 downstream of valve 70; and the level of the signal in circuit 77 indicates this condition to the computer. Also valve 76 is closed and, since there is no flow in conduit 28, the output or lack thereof from the flow sensing transducer will indicate this condition to the computer through circuit 84. Solenoid-controlled valve 66 is open and the pressure inside storage tank 20 is, therefore, applied to one side of the diaphragm 61 of pressure differential cell 60. The signal from the cell is, therefore, indicative of zero pressure differential at this point in the cycle. Also, since the other side of the diaphragm 61 is connected to conduit 28 at a point between storage tank 20 and closed valve 70, there is no pressure difference across the differential cell 60. Therefore, the cell produces no signal in line 69 at this point. Also, since there is no pressure in conduit 28 downstream of valve 70, the regulator 74 is fully open. Thus, conduit 28 downstream of the valve 70 and dispensing hose 30 are open and in condition to begin a dispensing operation. With the system in this condition, the computer will produce a signal in line 90 to cause the ready light 88 to indicate that the system is in condition to begin a dispensing operation.

It will be understood that, in accordance with well known computer operation, the computer 50 will be continuously scanning circuits 42, 46, 69, 77 and 84 to ascertain the presence, absence, or change in magnitude of the signals in these circuits. Thus, the steady-state initial values of the pressure and temperature in tank 20 will be registered in the memory of the computer from the signals in lines 46 and 42. To begin a dispensing operation, the flexible conduit 30 is first connected to tank 32 by means of a conventional pressure-tight connection 33. The one-way valve 34 at tank 32 prevents the flow of gas from tank 32 into line 30 in the event any residual gas under pressure remains in the tank 32. The momentary contact initiate button switch 86 is then closed which causes an electric signal to be applied to the computer through circuit 89. As soon as the computer senses a signal in circuit 89, and if the pressure and temperature in tank 20 are stable, it will send a signal through circuit 68 to close valve 66, thereby trapping the initial pressure in tank 20 ($P_{T1}$) on one side of diaphragm 61 of cell 60. At the same time, a signal will be sent through line 72 to open valve 70 whereupon CNG will begin to flow from tank 20 through conduits 28 and 30 into tank 32. As soon as flow begins in conduit 28, the transducer 82 will produce a signal in circuit 84 the level of which indicates to the computer that CNG is flowing through conduit 28. This signal will be maintained so long as the flow of CNG in fact continues in conduit 28.

Flow will continue through conduits 28 and 30 until pressure in tank 32 and conduits 28 and 30 reaches 2400 p.s.i., or any other preselected pressure for which the regulator has been set, at which point the regulator 74 will close, stopping all further flow of CNG through conduits 28 and 30. The termination of flow in conduit 28 will be sensed by flow transducer 82, which will signal the computer to condition it to calculate the amount of CNG delivered. However, the computer will not actually calculate the amount of CNG delivered until the pressure and temperature in the system has reached a steady-state condition. As mentioned above, the computer continuously and repetitively scans circuits 42, 46, 69 and 75 and calculates the changes in the value of the signals in these circuits over very short periods of time. When these changes reach zero, or some other minimum value, the final pressure $P_{T2}$ and temperature $T_{T2}$ in the tank as indicated by the value of the signals in circuits 46 and 42, respectively, and the final pressure differential $\Delta P$ across cell 60, as indicated by the signal in circuit 69, will be registered and the dispensed volume $\Delta V$ will be calculated in accordance with equation (5) or equation (8), as set forth above. A signal representative of the dispensed volume $\Delta V$ will then be sent through circuit 98 to readout panel 100 where the dispensed volume $\Delta V$ will be displayed.

As soon as flow in conduit 28 is terminated as signaled by transducer 82, the computer will signal valves 70 through circuit 72 to close and will signal bleed valve 76 through circuit 80 to open and thereby relieving the pressure in conduit 28 downstream of regulator 74 and in conduit 30. As soon as pressure in conduit 28 downstream of regulator 74 is relieved, the regulator will open relieving the pressure in conduit 28 between valve 70 and regulator 74. It will be understood that the opening of valve 76 and regulator 74 and the closing of valve 70 will take place virtually simultaneously. Valve 70 and regulator 74 are now in condition for the next dispensing cycle. Pressure transducer 75 senses the condition when the pressure is relieved in these lines and signals this condition to the computer through circuit 77 which then activates disconnect indicator 92 through circuit 94 so that the operator in charge of the dispensing operation will know when the line 30 may be disconnected from tank 32.

Upon termination of the flow in conduit 28, as signaled by flow transducer 82, and completion of the calculation of the dispensed volume, the computer will signal valves 23 and 66 to open via circuits 21 and 68, respectively, and will close bleed valve 76 by means of a signal transmitted through circuit 80. Thus, valves 66, 70 and 76 and regulator 74 are all conditioned to begin the next dispensing cycle.

When valve 23 is opened, CNG begins to flow through conduit 24 to recharge tank 20. As soon as the pressure in the tank 20 reaches a steady-state pressure of 3600 p.s.i. as sensed by the computer through transducer 44 and circuit 46, the computer will signal valve 23 to close, thereby returning the entire system to its initial condition and conditioning it for the next dispensing operation.

It is possible to begin the next dispensing cycle before the tank 20 has been charged to its full capacity of 3600 p.s.i.. When the cycle initiate button 86 is closed, if the pressure in tank 20 as sensed by the computer through circuit 46 is less than 3600 p.s.i., the computer will signal the valve 23 to close to establish a stable condition of pressure and temperature in tank 20. The steady state values of the pressure and temperature will be recorded by the computer and thereupon the computer will simultaneously signal valve 70 to open to re-establish flow in conduits 28 and 30 and signal valve 66 to close to trap the initial pressure in tank 20 $P_{T1}$ in cell 60. The process described above will then be repeated.

Figure 2:
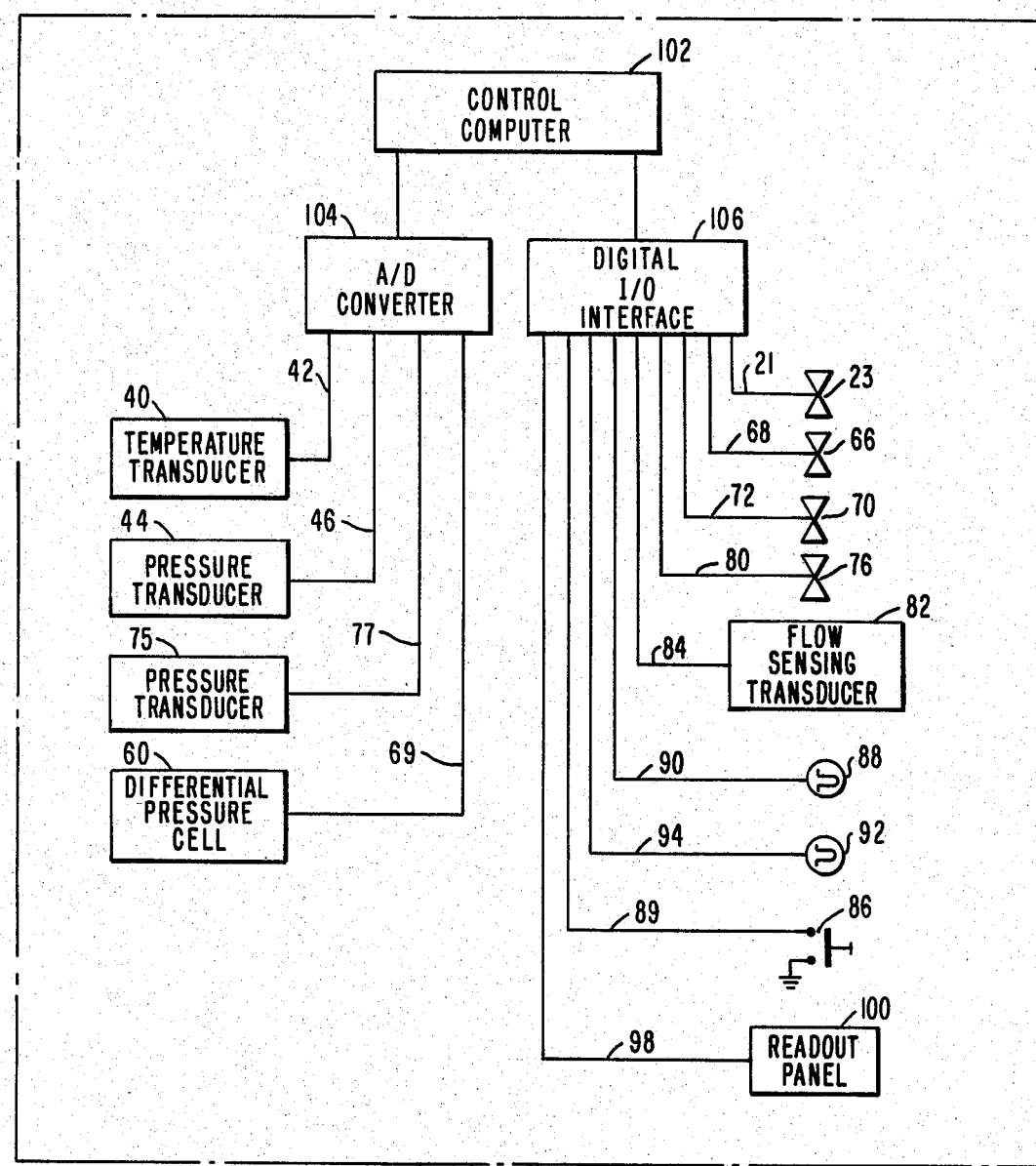
FIG. 2 is a functional block diagram of the architecture of the process control computer shown generally in FIG. 1.

The architecture of the process control computer 50, as generally shown in FIG. 1, is shown in detail in FIG. 2. The process control computer 50 includes a control computer 102, which, in an illustrative embodiment of this invention, may take the form of that computer manufactured by Hewlett-Packard under their designation HP1000/40. The computer 102 is associated with an accessible memory having a storage capacity illustratively of 128K bytes and is coupled via an analog-to-digital (A/D) converter 104 illustratively in the form of an A/D converter manufactured by Hewlett-Packard under their designation HP91000 A/2313A, to a plurality of analog devices including the temperature transducer 40, the pressure transducer 44, the pressure transducer 75, and the differential pressure cell 60. A digital input/output (I/O) interface 106 serves to connect the control computer 102 to a plurality of digital devices such as the valves 23, 66, 70 and 76, the flow sensing transducer 82, the lamps 88 and 92, the switch 86 and the readout panel 100.

Figure 3:
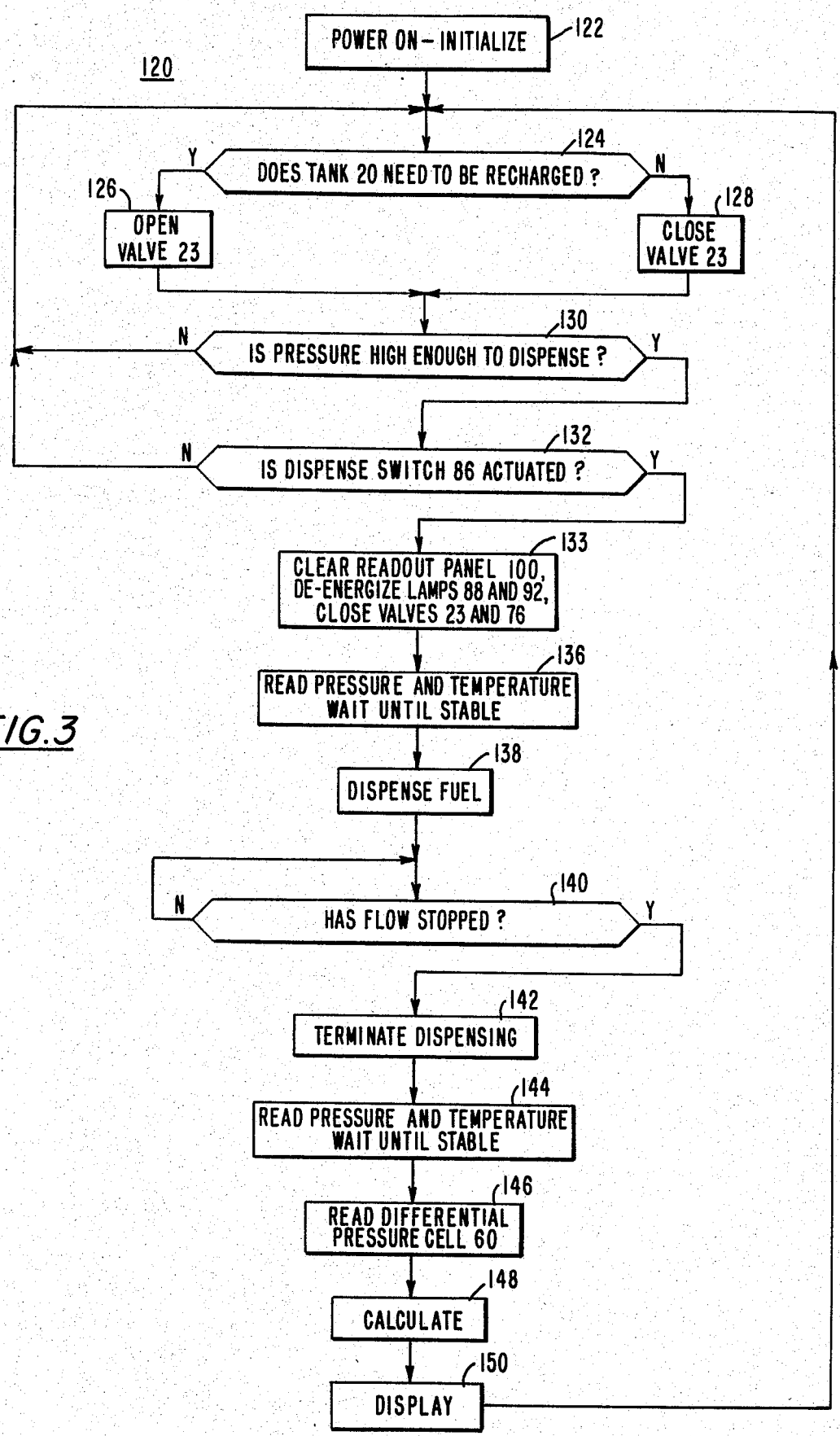
FIG. 3 is a flow diagram of an illustrative embodiment of the program stored in the memory of the process control computer shown in FIGS. 1 and 2.

Referring now to FIG. 3, there is illustrated a high level flow diagram of a program 120 stored in the memory of the computer 102. The program 120 is entered in step 122 which initializes the various values within the system. For example, it is necessary to enter a value corresponding to the cost per unit of volume of the compressed natural gas, the current data for billing and record keeping purposes etc. It is also necessary to set the various valves to their initial operating conditions. Thus, the valves 23 and 70 are initially closed and the valves 66 and 76 are opened. Further, the disconnect lamp 92 and the ready lamp 88 are turned off and any previous reading upon the readout panel 100 is cleared.

Next in step 124, the computer 102 accesses the pressure transducer 44 and the temperature transducer 40 to obtain the then existing values of the pressure and temperature of the compressed natural gas within the storage tank 20, whereby a determination is made as to whether the storage tank 20 needs to be recharged by the compressor 22. If yes (Y), the program moves to step 126, wherein the charging valve 23 is opened to permit the compressor 22 to direct the compressed natural gas through conduit 24, the opened valve 23 and into the storage tank 20, thus increasing the pressure of the compressed natural gas within the storage tank 20. On the other hand, if step 124 determines that the storage tank 20 does not need to be recharged (N), the program moves to step 128, wherein the charging valve 23 is closed.

Step 124 includes a plurality of substeps including accessing the temperature 40 and the pressure transducer 44 to first obtain readings of temperature and pressure and storing these measurements within locations $P_{T1}$ and $T_{T1}$ of the computer's memory. These values will be saved and will be used in step 136, as will be explained. Next, the pressure transducer 75 is accessed to determine the pressure of the compressed natural gas within the hose 30. If the pressure within the hose 30 is not zero, the bleed valve 76 is opened to permit any residual compressed natural gas to bleed through the open valve 76. On the other hand, if the pressure of the compressed natural gas within the hose 30 is zero, the bleed valve 76 is closed. Then a reading of the pressure transducer 44 is taken to determine whether that value of pressure within the storage tank 20 is above a first high limit indicative of a dangerous condition; if so, the charging valve 23 is closed and a suitable alarm is actuated indicative of this dangerous condition. On the other hand, if the value of the pressure of the compressed natural gas within the storage tank 20 is below the first limit, that value is compared with a tank charge limit, iullustratively 3600 p.s.i.. If less than the tank charge limit, the program moves to step 126 which opens valve 23 to charge the tank. If greater, then the tank charge limit, the program proceeds to step 128 to close valve 23.

Next, step 130 determines whether the pressure of the compressed natural gas within the storage tank 20 is high enough to dispense and, in particular, determines whether the pressure is above a dispensing limit, e.g. 3000 p.s.i.; if yes, the program moves to step 132 wherein the ready lamp 88 is energized and the program waits for the dispense switch 86 to be actuated. If no, the program returns to step 124.

As seen in FIG. 1, the operator is informed by the energized ready lamp 88 that the system is ready to dispense the compressed natural gas. The operator then connects the hose 30 to the vehicle fuel tank 32 through coupling 33. Thereafter, the operator actuates the dispense switch 86. The program, as shown in FIG. 3, loops through steps 124, 130 and 132 looking particularly in step 132 for the dispense switch 86 to be actuated and checks whether the ready light 88 is energized. The process will continue to loop through steps 124, 130 and 132 until the operator actuates the dispense switch 86.

After the dispense switch 86 has been actuated, the program proceeds to step 133 which clears the readout panel 100, de-energizes the ready lamp 88 and the disconnect lamp 92, closes the charging valve 23 and the bleed valve 76. The program then proceeds to step 136 which checks the values of the pressure and temperature of the compressed natural gas within the storage tank 20 to determine whether these values have stabilized. In particular, the program effects a short delay of several seconds before accessing the temperature transducer 40 and the pressure transducer 44 to obtain corresponding values of the pressure and temperature of the compressed natural gas within the storage tank 20. Then, the stabilized value of the pressure of the compressed natural gas as most recently taken is compared with that original value of pressure stored within the storage location $P_{T1}$, as explained above, to obtain a difference between the two and, if this difference is greater than a steady state limit (SSLIM), the most current value of pressure is saved in the storage location $P_{T1}$ of the control computer memory and a further reading of the storage tank pressure is taken. The read and compare steps are repeated until the pressure difference is within the steady state limit. In a similar fashion, a second value of storage tank temperature is taken and a difference of the current value of the storage tank temperature and that value as saved within the storage location $T_{T1}$ is compared with a steady state limit (SSLIM) and, if greater than the limit, the current storage tank temperature is saved within the storage location $T_{T1}$ of the control computer memory and the step of reading and comparing the storage tank temperature values is repeated until the difference is less than the steady state limit.

After the pressure and temperature of the compressed natural gas within the storage tank 20 has stabilized, step 138 initiates the dispensing of the compressed natural gas. In particular, the valve 66 is first closed to trap the initial pressure of the compressed natural gas within the differential pressure cell 60. Thereafter, a check test of the differential pressure cell 60 is carried out by accessing the cell 60 and determining whether the measured differential pressure $\Delta P$ is equal to zero. If no, a suitable alarm is actuated before exiting to the beginning of the program thereby terminating the dispensing cycle. If the differential pressure cell 60 is operative, the feed valve 70 is opened to permit the compressed natural gas to flow from the storage tank 20 through the opened feed valve 70, the flexible hose 30 and into the vehicle fuel tank 32 through one-way valve 34.

The flow of the compressed natural gas into the vehicle fuel tank 32 will continue until the gas pressures within the vehicle fuel tank 32 and the lines downstream of the regulator 74 reach the predetermined level for which the regulator has been set, e.g. 2400 p.s.i., at which time the regulator will close and there will be no further flow as sensed by the flow sensing transducer 82. Step 140 determines whether the gas flow has stopped by accessing the flow sensing transducer 82 by determining whether the rate of flow is greater than a predetermined minimum; if yes, indicating a continued flow, further readings of the flow sensing transducer 82 are made until the flow is less than the minimum limit, at which time, the program moves to step 142 to terminate the dispensing of the compressed natural gas into the vehicle fuel tank 32. Step 142 closes the feed valve 70 before opening the bleed valve 76 to release the pressure of the gas remaining within the flexible hose 30 and conduit 28 downstream of the valve 70. Since valve 34 is a one-way valve, it will close as soon as pressure is relieved in the hose to prevent escape of the natural gas from the vehicle fuel tank 32. After the pressure has been relieved within the hose 30, the disconnect lamp 92 is energized informing the operator that the hose 30 may be disconnected from the vehicle.

After the dispensing of the compressed natural gas has been terminated and the valve 70 is closed, step 144 determines that the values of temperature and pressure of the compressed natural gas within the storage tank 20 have stabilized. First, step 144 accesses the pressure transducer 44 and the temperature transducer 40 to obtain and store values of storage tank pressure and temperature within locations $P_{T2}$ and $P_{T2}$ of the control computer memory. After waiting a short interval in the order of several seconds, the pressure and temperature transducers 44 and 40 are again accessed to obtain further values of storage tank pressure and temperature. Thereafter, the difference between the initial and current values of pressure is compared with a steady state limit (SSLIM) and, if less, this is an indication that the pressure has reached a stabilized value. Similarly, the difference between the initial and current values of temperature is compared with a steady state limit and, if less than a steady state limit, the temperature of the compressed natural gas within the storage tank 20 has stabilized. If either the temperature or pressure has not yet stabilized, the sensed value of temperature or pressure is retained in the storage locations $T_{T2}$ and $P_{T2}$, respectively and, after another interval, further readings of temperature and pressure are taken.

After the pressure and temperature of the compressed natural gas have stabilized, the program moves to step 146, wherein the differential pressure cell 60 is accessed and a value of the differential pressure $\Delta P$ is taken. Thereafter, step 148 calculates the dispensed volume of compressed natural gas from the storage tank 20 to the vehicle fuel tank 32 in accordance with equation (8) given above. The initial values of pressure and temperature are saved in the storage locations $P_{T1}$ and $T_{T1}$ of the control computer memory, the value of temperature as taken in step 144 is saved in storage location $T_{T2}$ and the value of differential pressure P is obtained by step 146; these values are then inserted into the equation (8) and a calculation of the dispensed gas $\Delta V_s$ is carried out. In addition, the cost of gas was entered in step 122 and is available to calculate the cost of the dispensed gas as the product of $\Delta V_s$ and the unit volume price. The program then proceeds to step 150 at which point the readout panel 100 displays the dispensed gas $\Delta V_s$ and its cost. Thereafter, as indicated in FIG. 3, the program returns to step 124, whereby the system as shown in FIG. 1 prepares itself to recharge tank 20, if necessary, and to dispense gas into the next vehicle fuel tank.

While the invention described herein has been described in connection with the dispensing of CNG to a vehicle tank, it will be appreciated that the instant invention is equally useful in dispensing other gases to any closed container.

We claim:

1. A system for dispensing compressed gas comprising; a source of gas under pressure, conduit means for connecting said source to a receptacle to be charged with gas from said source, a control valve in said conduit for selectively closing and opening said conduit, temperature transducer means adapted to produce respective signals corresponding to the change in the temperature of the gas in said source as a result of a dispensing operation, pressure transducer means adapted to produce respective signals corresponding to the change in the pressure of the gas in said source as a result of a dispensing operation, a process control computer, means for applying said temperature and pressure signals to said computer, said computer being comprised of means for registering the value of said signals and means for calculating the volume of gas dispensed as a function of said respective temperature and pressure signals.

2. The system defined in claim 1 in which said pressure transducer means includes means for sensing the difference in the pressure in said vessel before a dispensing operation and after a dispensing operation.

3. The system defined in claim 2 in which said means for sensing said difference is a differential pressure cell.

4. The system defined in claim 1 in which said pressure transducer means includes means for sensing the pressure in said vessel before and after said operation.

5. The system defined in claim 1 in which said control valve is controlled by a signal from said computer.

6. The system defined in claim 5 together with a pressure regulator in said conduit downstream of said control valve adapted to maintain the pressure in said conduit downstream of said regulator at a preselected value less than the value of the pressure in said vessel.

7. The system defined in claim 6 in which the end of the dispensing operation is defined when the pressure in said conduit downstream of said regulator reaches said preselected value causing said regulator to close.

8. The system defined in claim 7 together with a bleed valve connected to said conduit for relieving the pressure in said conduit downstream of said regulator after completion of said dispensing operation.

9. The system defined in claim 5 together with a flow sensing transducer in said conduit for producing a signal to said computer indicative of whether or not gas is flowing in said conduit.

10. The system defined in claim 9 in which said computer is programmed to close said control valve when the signal from said flow transducer indicates that the flow in said conduit has terminated.

11. The system defined in claim 8 in which said computer is programmed to open said bleed valve after the signal from said flow transducer indicates that the flow in said conduit has terminated.

12. The system defined in claim 5 together with a pressure transducer in said conduit downstream of said control valve adapted to apply a signal to said computer indicative of the pressure condition in said conduit downstream of said control valve, said computer being programmed to produce a signal in accordance with the signal received from said pressure transducer.

13. A system for dispensing compressed gas comprising:
a source of gas under pressure, conduit means extending from said source for connecting said source to a receptacle to be charged with gas from said source, a control valve in said conduit for selectively closing and opening said conduit, a temperature transducer adapted to produce a signal representative of the temperature of the gas in said source, a pressure transducer adapted to produce a signal representative of the pressure of the gas in said source, computer means, means for applying said temperature and pressure signals to said computer, said computer including means for registering the temperature and pressure of the gas in said source before and after a dispensing operation and including means for calculating the volume of gas dispensed as a function of said temperature and pressure signals before and after said dispensing operation.

14. The system of claim 13 together with readout means controlled by said computer for providing an indication of the volume dispensed during said dispensing operation.

15. A system for dispensing compressed gas comprising:
a source of gas under pressure, conduit means extending from said source for connecting said source to a receptacle to be charged with gas from said source, a control valve in said conduit for selectively closing and opening said conduit, temperature transducer means adapted to produce respective signals corresponding to the change in the temperature of the gas in said source as a result of a dispensing operation, pressure transducer means adapted to produce respective signals corresponding to the change in the pressure of the gas in said source as a result of a dispensing operation, computer means, means for applying said temperature and pressure signals to said computer means, said computer means being comprised of means for registering the value of said signals and means for calculating the volume of gas dispensed as a function of said respective temperature and pressure signals, a regulator in said conduit downstream of said control valve adapted to maintain the pressure in said conduit downstream of said regulator at a preselected value less than the value of the pressure in said vessel, a flow sensing transducer in said conduit adapted to apply a signal to said computer means indicative of whether or not gas is flowing in said conduit, said computer means being programmed to close said control valve when the signal from said flow transducer indicates that the flow in said conduit has terminated.

16. The method of dispensing compressed natural gas from a pressurized storage vessel to a receptacle under less pressure than the vessel comprised of the steps of:
(1) connecting said storage vessel and said receptacle with a conduit;
(2) sensing the temperature and pressure of the gas within the vessel before the dispensing cycle is initiated;
(3) initiating the flow of gas through said conduit from said vessel to said receptacle;
(4) sensing the temperature and pressure in said vessel after the flow through said conduit has been terminated;
(5) calculating the amount of gas in standard terms discharged from said storage vessel from the initial and final values of pressure and temperature.

17. The method of dispensing compressed natural gas from a closed storage vessel containing gas under pressure to a receptacle comprising the steps of:
(1) connecting said storage vessel and said receptacle with a conduit;
(2) recording the actual values of the temperature and pressure within said storage vessel before the dispensing operation is initiated;

(3) calculated and recording the standard volume of gas within said storage vessel before and dispensing operation is initiated;

(4) initiating the flow of gas through said conduit from said storage vessel to said receptacle.

(5) recording the final values of the temperature and pressure within said storage vessel after said dispensing operation is completed;

(6) calculating and recording the standard volume of the gas within said storage vessel after said dispensing operation is completed; and (7) subtracting the standard volume within said storage vessel after the dispensing operation from the standard volume within said storage vessel before said dispensing operation was initiated.

18. A system for dispensing compressed gas comprising:

a source of gas under pressure, conduit means connecting said source to a receptacle to be charged with gas from said source, a control valve in said conduit for selectively closing and opening said conduit, a temperature transducer adapted to produce a signal representative of the temperature of the gas in said source, a pressure transducer adapted to produce a signal representative of the pressure of the gas in said source, computer means having memory, means for applying said temperature and pressure signals to said computer means, said computer means including means for registering the temperature and pressure of the gas in said source before and after a dispensing operation, said computer means having a program stored in said memory to calculate the volume of gas dispensed as a function of said temperature and pressure signals before and after said dispensing operation.

19. The system defined in claim 18, wherein said computer means is programmed to access said pressure transducer to provide pressure signals indicative of the pressure within said source.

20. The system defined in claim 19, wherein said system comprises compressor means for delivering the gas under pressure to said source and a charging valve disposed to control the gas flow from said compressor means to said source, said computer means programmed to compare said pressure signal with a normal low limit thereof and, if less, for opening said charging valve to permit the pressure of gas within said source to increase.

21. The system defined in claim 20, wherein said computer means compares said pressure signal with a high normal limit and, if greater, for closing said charging valve to terminate the increasing of the pressure of the gas within said source.

22. The system defined in claim 21, wherein said computer means is responsive to the closing of said charging valve for accessing said temperature transducer and said pressure transducer to obtain first temperature and pressure signals respectively indicative of initial values of temperature and pressure of the gas in said source, for storing said first temperature and pressure signals in said memory, and for opening said control valve to commence the dispensing of the gas from said source to said receptacle.

23. The system defined in claim 22, wherein there is included a transducer for measuring the rate of flow of the gas through said conduit to provide a corresponding gas flow rate signal, said computer means being programmed to compare said gas flow rate signal with a predetermined value and, if less, for closing said control valve, whereby the dispensing of the gas is terminated.

24. The system defined in claim 23, wherein said computer means is programmed to be responsive to the closing of said control valve for accessing said temperature transducer and said pressure transducer to obtain second pressure and temperature signals indicative respectively of the pressure and temperature of the gas in said source after the dispensing of the gas, whereby the volume of gas dispensed may be calculated as a function of the first and second pressure and temperature signals.

25. The system defined in claim 24, wherein there is included differential pressure measuring means coupled to said source via a second conduit, a trapping valve disposed in said second conduit for trapping gas at the initial pressure within said differential pressure measuring means.

26. The system defined in claim 25, wherein said computer means is programmed to close said trapping valve in said second conduit before the opening of said control valve, and to access said differential pressure measuring means after said control valve has been closed to obtain a measurement of the pressure difference of the gas within said source before and after the dispensing of the gas.

27. The system defined in claim 22, wherein said computer means is programmed to respond to the closing of said charging valve to access repetitively said pressure transducer and said temperature transducer to determine that the temperature and pressure conditions of said gas in said source have stabilized.

28. The system defined in claim 27, wherein said computer means is programmed to access said pressure transducer and said temperature transducer to provide respectively preliminary pressure and temperature signals and to store said preliminary pressure and temperature signals in said memory, after a predetermined interval of time to access said pressure transducer and said temperature transducer to take subsequent pressure and temperature signals, and to obtain and compare the difference between said preliminary and subsequent pressure and temperature signals with steady state limits and, if less, to determine that the pressure and temperature conditions of the gas in said source have stabilized.

* * * * *